(12) United States Patent
Masek

(10) Patent No.: US 6,367,395 B1
(45) Date of Patent: Apr. 9, 2002

(54) METHOD OF DISPOSING OF ANIMAL WASTE

(76) Inventor: Tommy D. Masek, 1875 W. 1500 South, SLC, UT (US) 84104

( * ) Notice: Subject to any disclaimer, the term of this patent is extended or adjusted under 35 U.S.C. 154(b) by 0 days.

(21) Appl. No.: 09/706,545

(22) Filed: Nov. 6, 2000

(51) Int. Cl.$^7$ .............................. F23J 15/00; F12G 5/04
(52) U.S. Cl. ...................................... 110/345; 110/346
(58) Field of Search ................................ 110/342, 345, 110/346, 347, 165 L, 182.5, 233, 255, 258, 259, 227, 228, 224, 219, 204

(56) References Cited

U.S. PATENT DOCUMENTS

| | | | | |
|---|---|---|---|---|
| 2,378,805 A | * | 6/1945 | Spicer et al. ................ | 110/45 |
| 2,455,817 A | * | 12/1948 | Sherman ...................... | 110/45 |
| 2,948,237 A | * | 9/1960 | Toepel ......................... | 110/13 |
| 3,421,824 A | * | 1/1969 | Herbst ......................... | 431/10 |
| 3,628,472 A | * | 12/1971 | Lausmann .................. | 110/7 R |
| 3,638,591 A | * | 2/1972 | Lausmann .................. | 110/7 A |
| 3,697,056 A | * | 10/1972 | Prins et al. .................. | 263/8 R |
| 4,213,407 A | * | 7/1980 | Headley ...................... | 110/346 |
| 4,359,006 A | * | 11/1982 | Have ........................... | 110/346 |
| 4,429,643 A | * | 2/1984 | Mulholland ................. | 110/238 |
| 4,766,823 A | * | 8/1988 | Seabury ....................... | 110/346 |
| 5,297,495 A | * | 3/1994 | Weber ......................... | 110/346 |
| 5,954,001 A | * | 9/1999 | Morin ......................... | 110/245 |
| 6,135,035 A | * | 10/2000 | Masek ......................... | 110/228 |

* cited by examiner

Primary Examiner—Henry Bennett
Assistant Examiner—K. B. Rinehart

(57) ABSTRACT

A method of combustion of animal wastes to avoid release of objectionable odors and to obtain useful products from the animal wastes involving the drying of animal waste in a primary heat exchange dryer, mixing the dried animal waste material with a combustible fuel and moving the mix of dried waste and combustible fuel to a burner assembly of a furnace for burning, the exhaust from the primary heat exchange dryer being collected so that gases in the exhaust are used as combustion air for the burner assembly and with exhaust from the burner assembly housing being separated into fly ash and acceptably clean exhaust.

5 Claims, 8 Drawing Sheets

Figure 1:
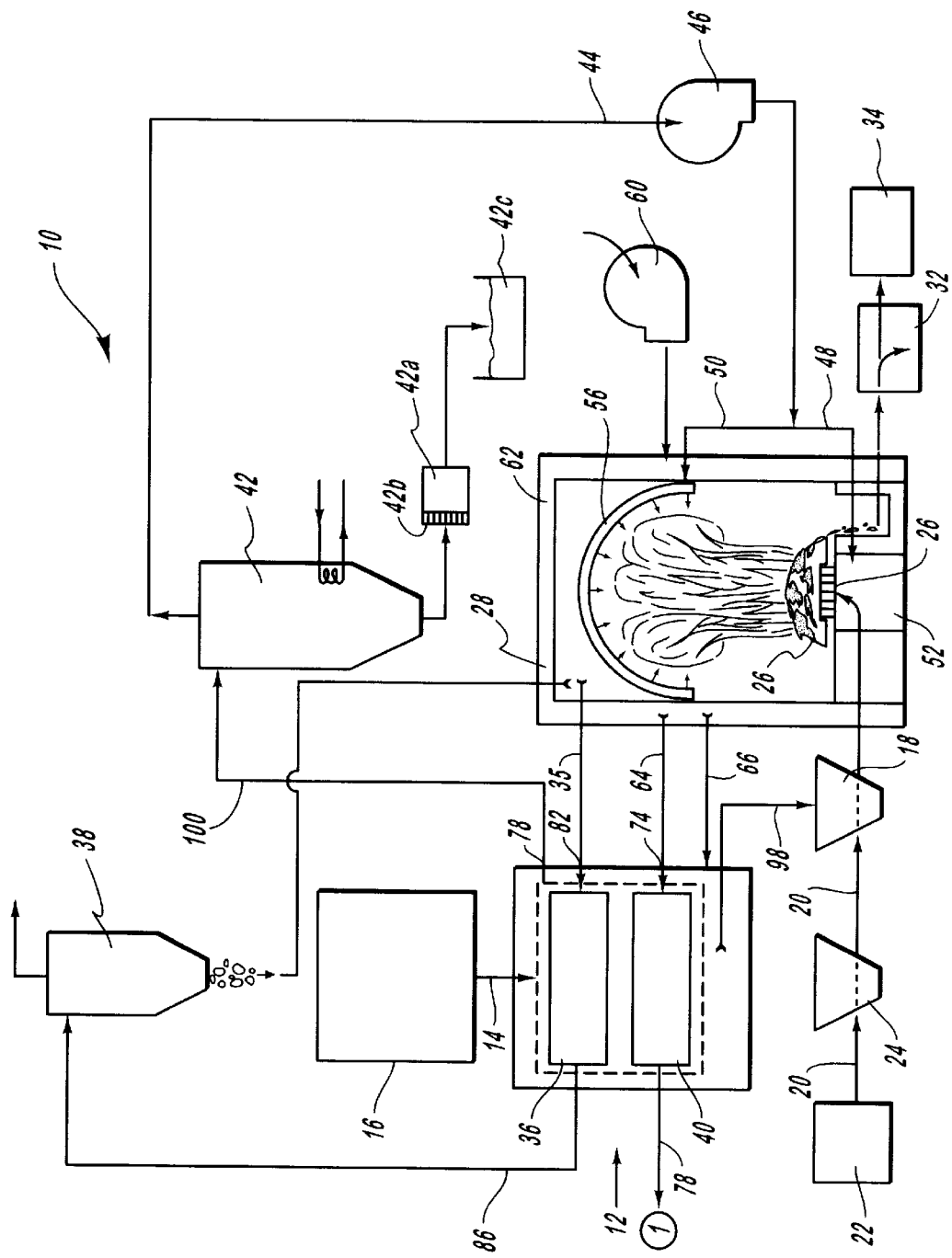

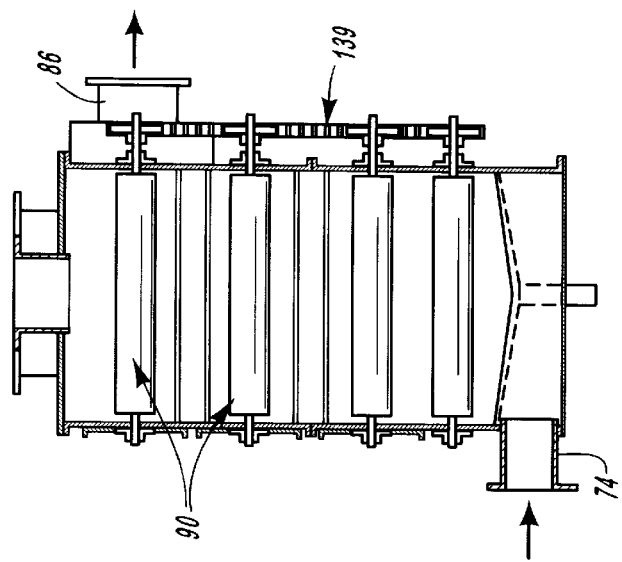
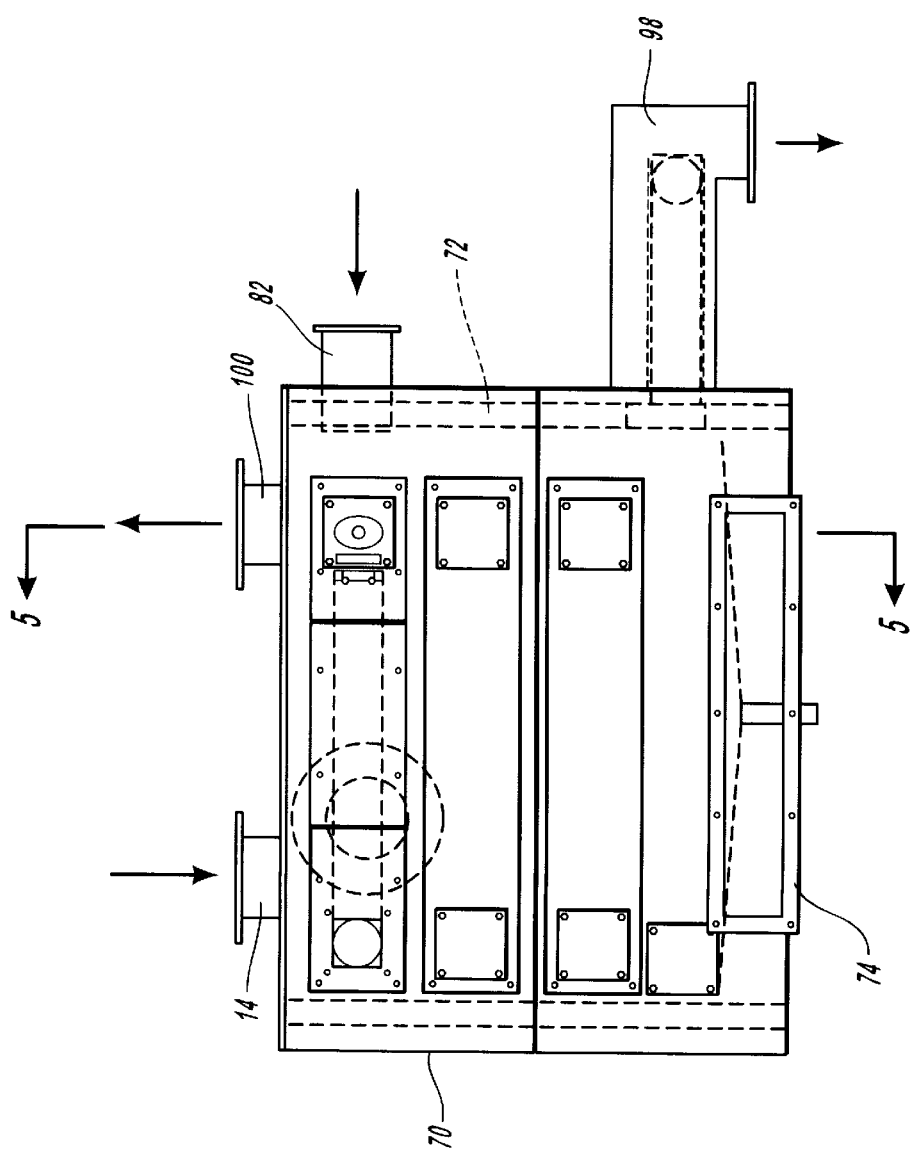

METHOD OF DISPOSING OF ANIMAL WASTE

BACKGROUND OF THE INVENTION

1. Field of the Invention

This invention relates to the disposal of animal waste, i.e., manure and is particularly concerned with a method of efficiently burning such waste material in a manner that is environmentally sound.

2. Prior Art

It has been estimated by the United States Department of Agriculture (USDA Report Misc. Pub. 1065, 1968) that nearly two billion tons of manure is generated annually in the United States. Using a density value of fifty pounds per cubic foot it has been calculated that this generated manure is enough to cover about thirty-five thousand square miles, i.e., the State of Indiana, with a one-inch layer annually. The problem is compounded by the fact that manure is produced in concentrated areas, such as feed lots, hog factories and large chicken factories, and in smaller animal processing operations, rather than being uniformly divided over the entire United States. Thus, large quantities need to be processed in local areas or both the large and small quantities need to be collected and transported to distant processing facilities.

Aside from the obvious odor problem associated with the processing of manure, other, not so obvious, problems exist. In many instances manure is mixed with water, as a result of the cleaning out of pens and stalls or by the falling rain and snow. The resulting contaminated water becomes a threat to streams, lakes and underground water supplies and ultimately to the drinking supply. Government agencies in areas of the United States having significant livestock operations are recognizing the dangers to the clean water supply and it has now become more difficult to obtain permits for large livestock operations in such areas. More recently it has become known that manure entering streams and lakes results in growth of organisms that attack and destroy fish in the streams and that even attack other animals and humans causing severe illness.

Even when used as fertilizer the animal wastes often present environmental problems that are costly and difficult to solve. For example, the manure generally contains weed seeds ingested by the animals with their feed grains. Present composting methods do not kill the weed seeds so herbicides are frequently added to the manure and when the manure is used as fertilizer the herbicide chemicals are added to the soil.

It is well recognized that when man creates environmental problems there is a cost associated with the clean-up or avoidance of the problem in the future. Trash dumped in the oceans, manufacturing process pollutants discharged into streams, rivers and lakes, exhaust emissions from automobiles and nuclear wastes are examples of environmental problems that are currently being addressed at great expense to the American taxpayer. Animal wastes represent just one more environmental problem that must be addressed to insure quality life for humans. Clearly, there is a need for methods and systems to dispose of manure, on-site, in a neat, cost effective manner.

At the present time current approaches to animal waste management are as old as the problem itself. Often it is merely spread on the ground as fertilizer or compost. Other times it is dumped into lagoons. Manure spread on the ground or placed in piles or in lagoons not only takes up large amounts of valuable ground space but creates incredible odors. The odors have resulted in the treating of the manure with chemicals to reduce or change the nature of the odors. The use of chemicals results in increased cost in the processing of the manure and the chemicals may not always be environmentally safe.

In most situations manure represents an expense and pollution liability rather than a marketable fertilizer product. In some instances, chicken litter (excreta and bedding material) can be used for cattle feed. In a limited number of areas manure is sold or given away. For most animal operations the manure is simply a nuisance. For producers unable to simply pile up manure there are, at the least, handling and transportation costs involved in moving the manure to a disposal location. Typically, for hogs, manure is produced approximately at the rate of two to three pounds per pound of weight gain. A hog will produce about six hundred pounds of manure over its four and one-half to six month life span. A producer marketing one thousand head per year would have about three hundred tons of raw manure to deal with. Since hog wastes are typically washed out of the hog pens, the total weight to be handled is probably three to four times the raw manure weight, or about one thousand tons. In addition to the costs involved in handling such large quantities of waste, it is noted that there are fewer and fewer locations where sites for the dumping of the large amount of waste can be handled. Consequently, the manure is confined to lagoons and becomes a nuisance to the producer and his neighbors.

There can be no doubt that there is a need for a method and system to dispose of manure, on-site, in a neat and cost effective manner.

SUMMARY OF THE INVENTION

1. Brief Description of the Invention

The present invention provides a method and system to combust manure. More particularly, using coal as fuel for the method of combustion.

2. Objects of the Invention

Principal objects are to provide a method and system for the burning of manure in an economical manner suitable for use by at least medium and large sized size animal operations.

Other objects are to provide for the processing of animal wastes to eliminate the health, safety and nuisance aspects while utilizing the inherent virtues of the material, i.e., its water content and its value as an energy source and as fertilizer. The heat generated by burning the animal waste, in conjunction with coal, can be readily used to create heated air, hot water or steam suitable for heating farm buildings. The animal waste can be collected and stored for such short periods of time as may be necessary to concentrate burning operations according to when the generated heat can be efficiently used for building heating. For larger animal raising operations the heat generated from the burning of the animal waste can efficiently be used in the generation of electricity to be sold or used in the farm operations.

Since most animal wastes contain a significant amount of moisture it is an object of the invention to provide a method and system for burning animal wastes containing high water content, (up to about 75%) and including slurry wastes that have been stored in lagoons or ponds.

3. Features of the Invention

In practicing the method of the invention animal waste is subjected to primary heat exchange to evaporate the bulk of moisture from the waste. The dried waste is then mixed with a combustible supplemental fuel and is burned. Water vapor and gasses separated during the primary heat exchange are processed to recover the water, the gasses and much of the heat used in the primary heat exchange. The recovered gasses are burned with the dried waste and supplemental fuel. Dry ash resulting from the burning of the dried waste, supplemental fuel and recovered gasses is collected for use in producing fertilizer. Exhaust from the burning of the dried waste and supplemental fuel is stripped to provide a clean exhaust suitable for discharge to atmosphere. Fly ash separated from the exhaust is mixed with dry ash in producing fertilizer. Excess heat, i.e. the heat in excess of that amount needed for drying, produced from the burning of the dried waste and supplemental fuel, is discharged to a use location, which may be a boiler, furnace, another system, or a building heating system.

The system used to perform the method of the invention includes a primary heat exchanger that will dry wastes without discharge of repugnant odors to the atmosphere. Preferably, the primary heat exchanger is heated using the heat generated by burning of the dried waste and a supplemental fuel. The primary heat exchanger may be variably constructed, depending upon the specific characteristics of the waste material and appropriate engineering considerations. However, apparatus providing for the isolation of evaporated gasses, the condensation of water vapor, and the subsequent burning of the non-condensable gasses is necessary to practice the method.

The presently preferred primary heat exchanger/dryer includes a stacked set of belt conveyors mounted within a housing. Heated air is passed through double-walled enclosure passages, around the belt conveyors transporting waste material and through horizontal passages formed in the heat exchanger/dryer. The heating of the waste material evaporates water and releases other gasses from the waste material.

A cyclone assembly, including a blower, separator, and condenser pulls primary evaporation products out of the primary heat exchanger/dryer, thereby producing a drying of the waste material. The belt conveyors transport and agitate the waste material to maximize exposure of waste material surface and to increase evaporation from the waste material. Preferably, also, the belts have cleats attached thereto to break up the waste material placed on the belts and brushes are used to prevent caking or buildup of waste material on the belts.

A first, or top endless belt, conveys waste material placed on the carrying surface thereof in a forward direction to the discharge end of the conveyor and dumps the material onto a heated skid plate. Brushes, serving as spaced cleats projecting from the carrying surface of the conveyor belt, sweep the heated skid plate during the return run of the endless belt. The brushes clean the heated skid plate and sweep the waste material dumped onto the heated skid plate, with a rolling motion, to and over an end of the heated skid plate where it drops onto the next or second belt. The waste material is transported by each endless belt and heated skid plate set, in the manner previously described, until it is thoroughly dried and is dropped onto a dried material conveyor and from that conveyor is dropped into a dry manure hopper that feeds the dried waste material onto a feed conveyor moving a mixture of waste material and coal into a burner assembly, where it is burned. The number of endless belt and heated skid plate sets provided depends upon factors such as the initial water content of the raw waste material, the waste volumetric rate, and the amount of heat that is allocated for drying versus use for other purposes. Drying can be accomplished at even moderate temperatures since a cyclone separator will maintain a low dew point by extracting vapor as it evaporates, thereby carrying the vapors away before they can recondense. A low air flow velocity within the conveyor prevents dust from being carried out with the products of evaporation.

A cyclone separator draws exhaust gasses from the primary heat exchanger at below atmospheric pressure to separate water from the exhaust and returns the non-condensable gasses, including to a large extent, those odiferous gasses that are water soluble and that might otherwise recombine with the separated water, to the retort of the burner assembly. Thus, the noxious odors are maintained isolated and do not escape to atmosphere.

The cyclone separator includes a heat exchanger section in which condensable gasses, primarily water vapor, will condense. In condensing, the water vapor will give up heat of vaporization, allowing a portion of the heat used for evaporation to be recovered. Water leaving the cyclone condenser is filtered in conventional fashion to remove water soluble materials, if any. Heat recovered from the cool side of the condenser heat exchanger is convected away with water or air flow and may be used in preheating functions, such as preheating of the raw waste material.

Gasses exhausted from the cyclone separator are piped to the inlet of the combustion air blower. Fresh air may also be added to the inlet of the combustion air blower. The amount of fresh air added is determined by the oxygen content of gasses coming from the cyclone separator, which oxygen content may be determined experimentally or by measurement. The fresh air and gasses from the cyclone separator are then forced into the burner assembly to supply oxygen for the complete combustion of the dried waste material and supplemental fuel. All gasses associated with the waste material and drying of the waste material are maintained separated from atmosphere throughout the process and any heat value from hydrocarbons is liberated in the burning process.

Preferably, the supplemental fuel used to burn the animal waste is crushed coal that is mixed with the dry animal waste in a stoker system having two fuel hoppers on a single screw conveyor feed line. The proportions of animal waste fuel and coal fuel are readily adjusted as necessary to produce desired combustion characteristics. Such characteristics include total heat release, gas temperature, and percentages of carbon dioxide, carbon monoxide, and oxygen. As in all combustion systems, the general goal is to maximize carbon dioxide and minimize oxygen and carbon monoxide. The additional product of combustion, water vapor, to a great extent, will be trapped in the combustion gas cyclone.

The preferred burner into which the combined fuels are transported is an underfeed coal stoker retort and tuyere assembly. The screw conveyor augers the fuel mixture upward from the bottom of a retort bowl into the burning zone. The tuyeres direct combustion air into the burning zone. As the fuel is consumed the remaining ash is pushed radially away from the burning zone onto an ash removal ring. The ash removal ring, rotating at a slow rate and having a fins on an upper surface, moves ash circumferentially until it drops into a trough containing an ash removal auger. Ash is then transported to a collection receptacle for subsequent use as fertilizer. The under feed stoker works well for coal firing rates up to 1500 lbs/hr. For larger applications other coal burning systems, such as those used for large industrial plants and in power generation plants, may be used.

While crushed coal is the preferred supplemental fuel, other fuels can be used in practicing the method of the invention. Typical suitable fuels include pulverized coal, saw dust, wood chips, chicken litter, nut shells, and other bio-mass materials with sufficient energy content to support a clean burning, high temperature combustion process. To accommodate the various fuels, a curved diverter or baffle is provided within the combustion chamber to re-circulate light particles which may be blown out of the primary combustion zone. Unburned particles entrained with the combustion gasses are directed back down into a secondary combustion zone, along with combustion air injected through the diverter, to maximize combustion efficiency. Combustion gasses then travel laterally along the diverter in order to reach the flue. Recirculation and forcing of the gasses around edges of the diverter before exiting also aid in reducing the amount of fly ash carried from the combustion chamber with the gasses.

Combustion gasses exit the primary fire box and pass into a secondary fire box section. The secondary section provides additional surface area for heat exchange with circulation air. The secondary fire box section also serves as a trap for fly ash. Combustion gasses are forced to travel down past a deflector partially covering the flue gas outlet. The rapid change in gas direction during the exhaust process helps separate particulate material from the gas stream. The fly ash so separated settles to the bottom of the secondary section and passes through an opening in the fire box floor. The opening connects into the ash removal trough and the fly ash is conveyed out of the furnace along with the ash separated in the fire.

Additional objects and features of the invention will become apparent from the following detailed description and drawings.

THE DRAWINGS

Figure 2:
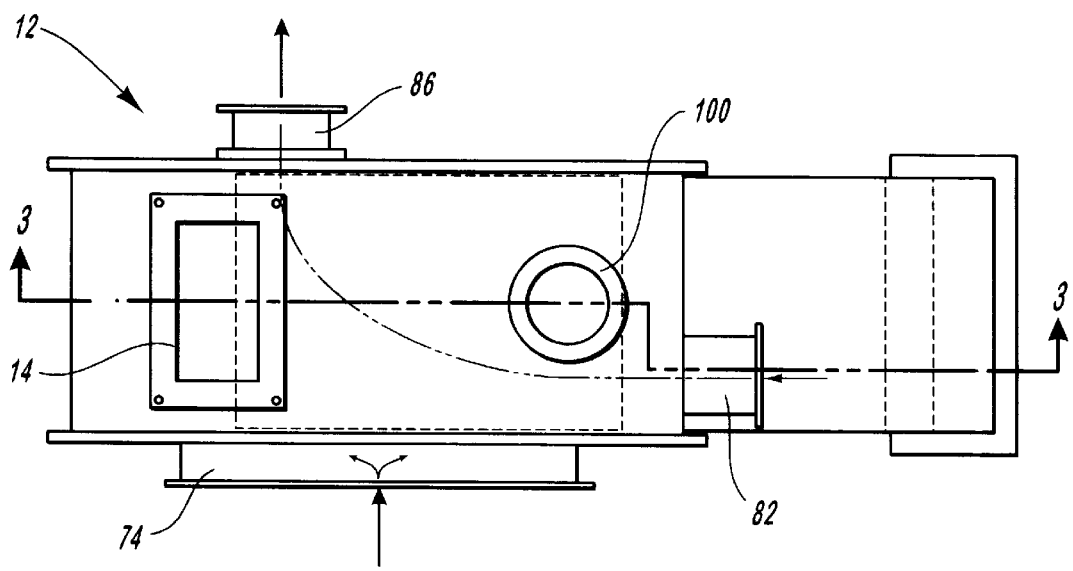
Figure 3:
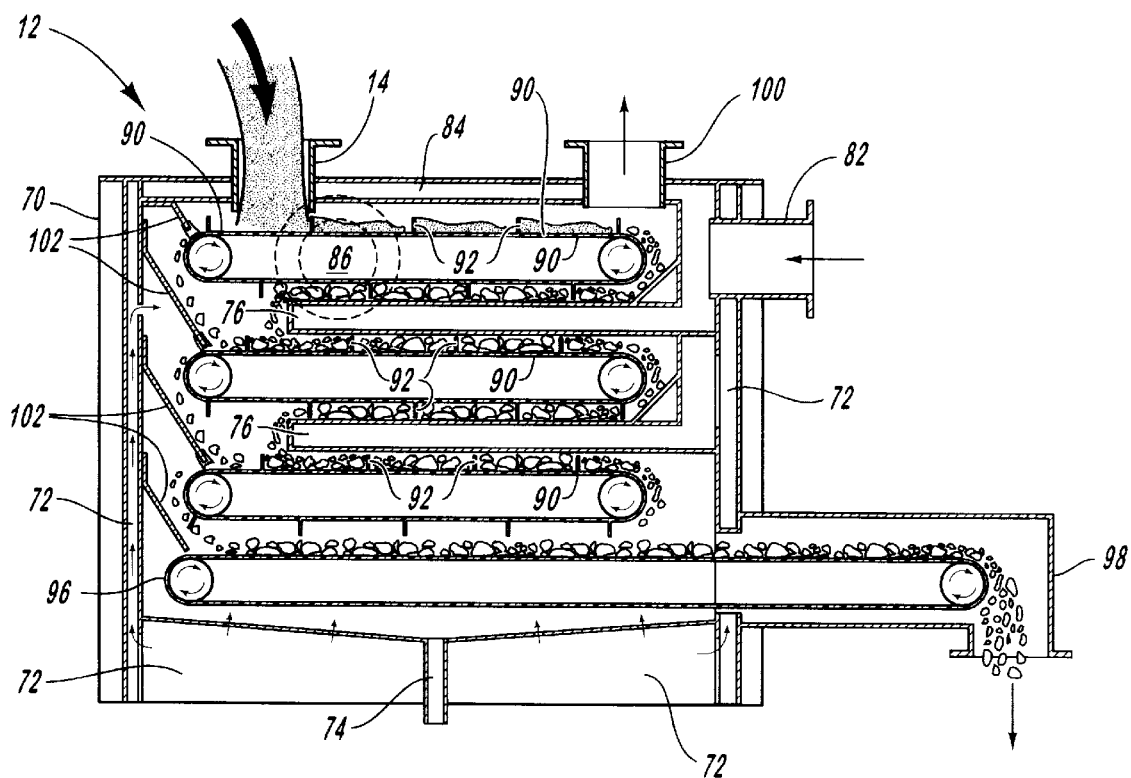
Figure 8:
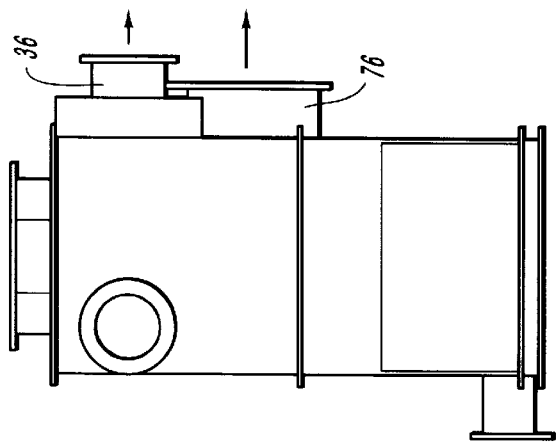
Figure 7:
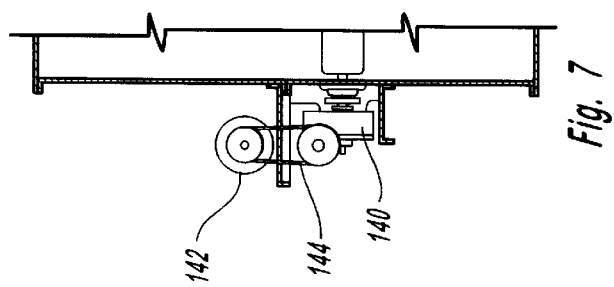
Figure 6:
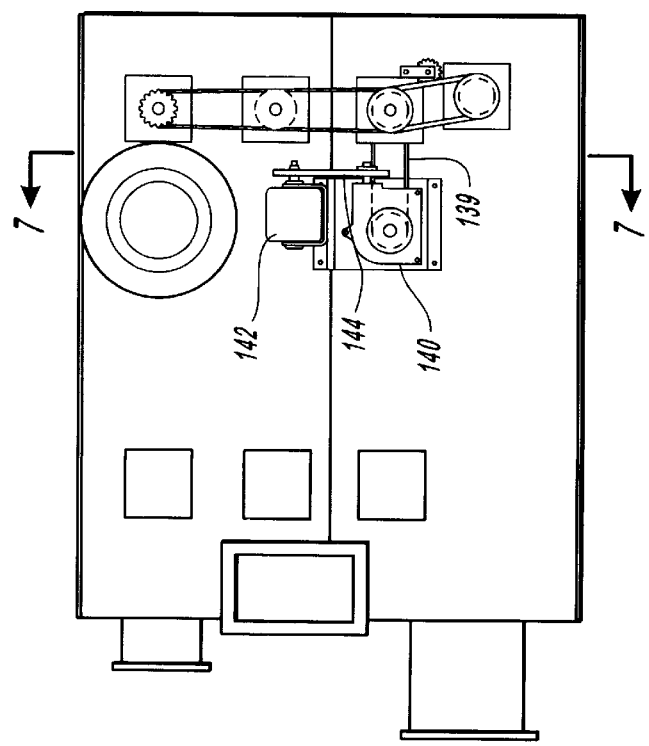
Figure 9:
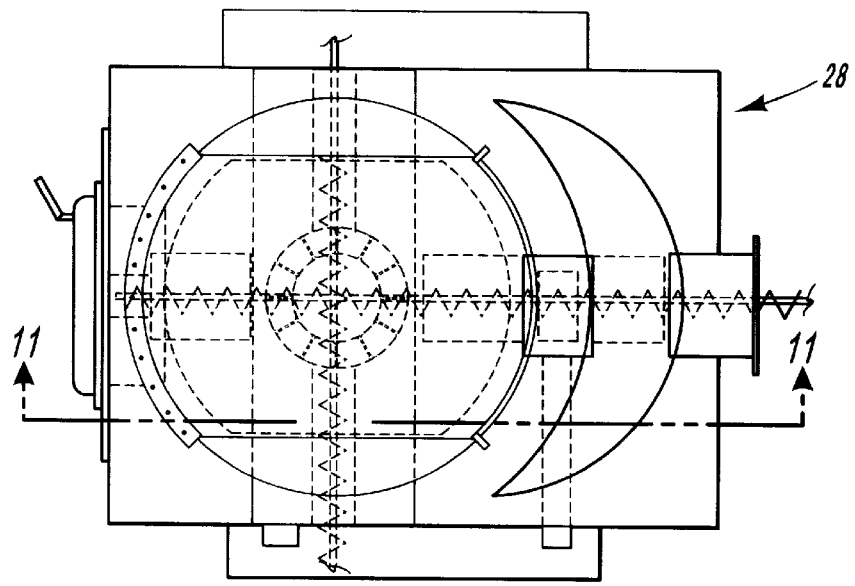
Figure 10:
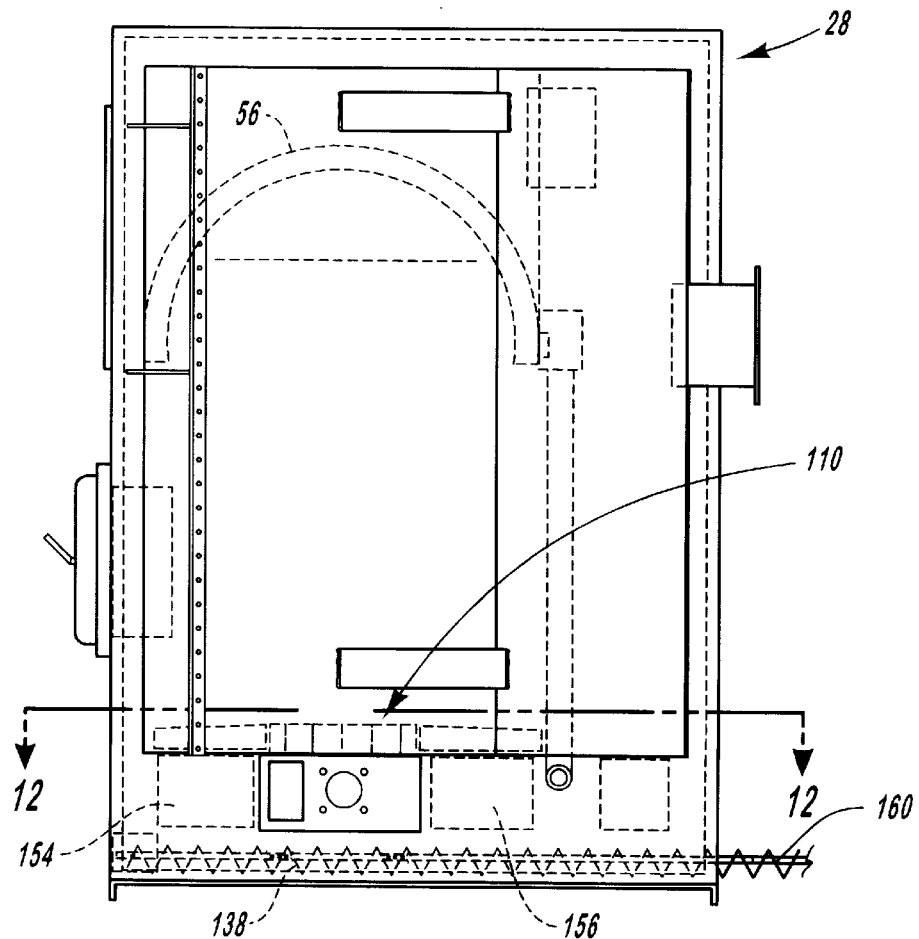
Figure 11:
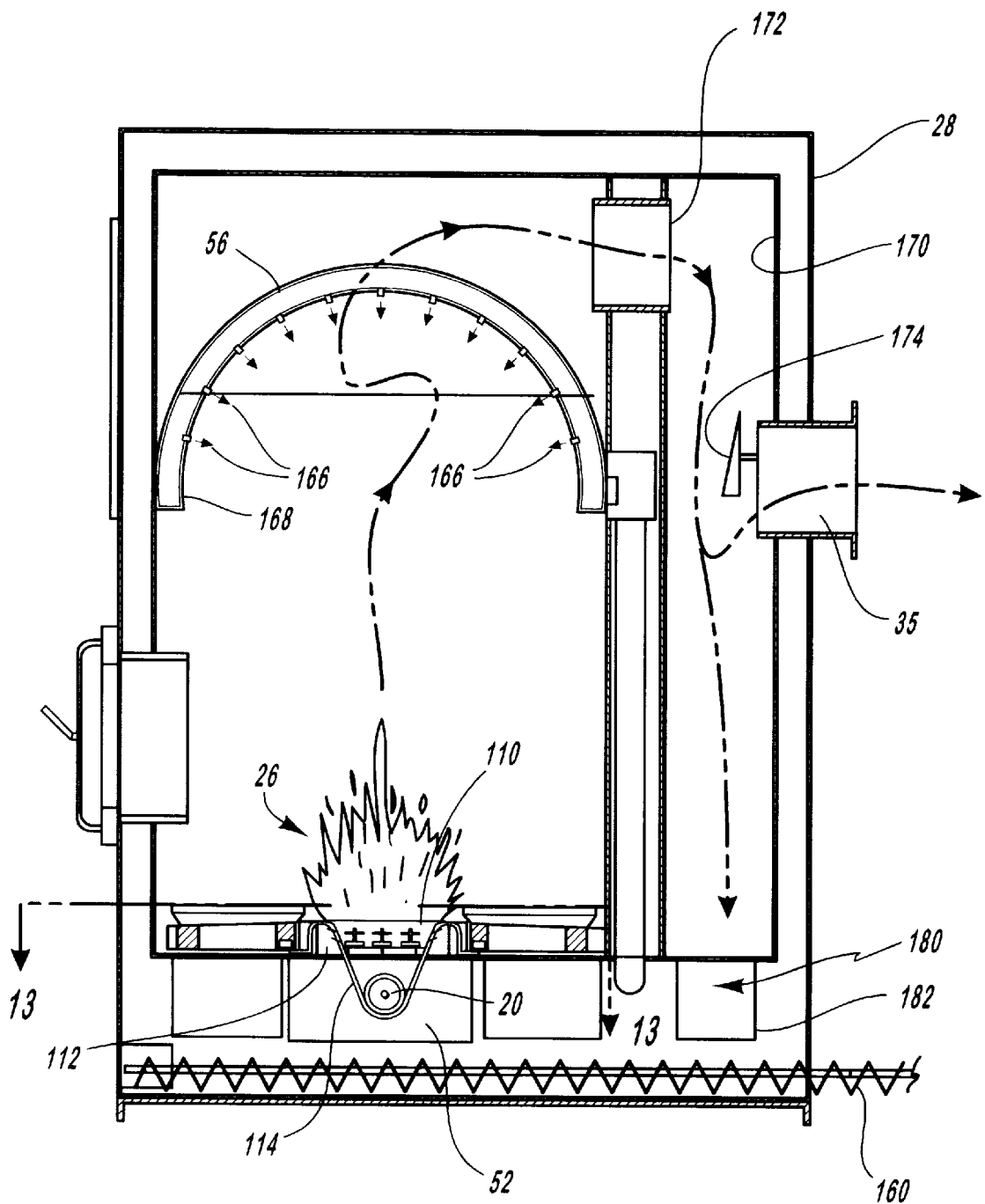
Figure 12:
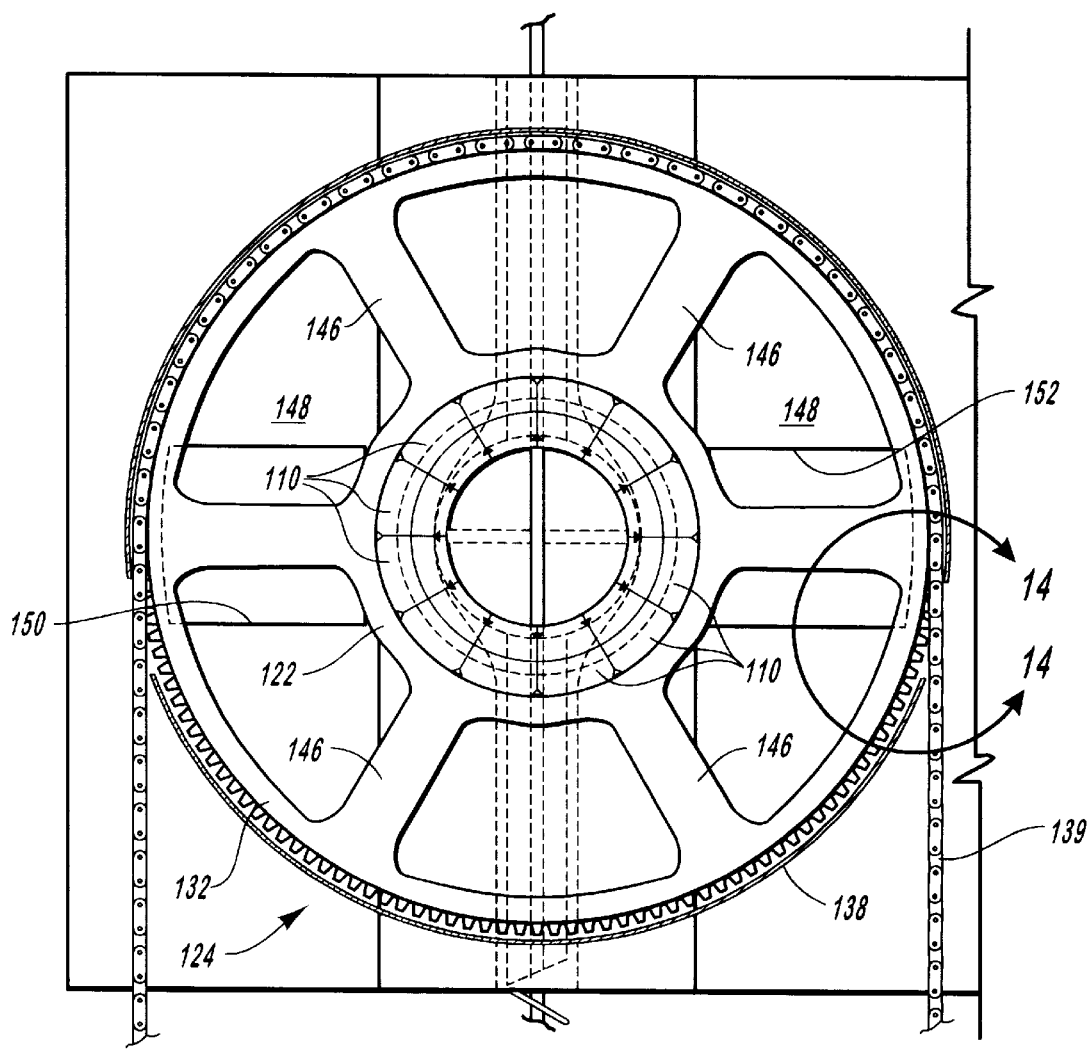
Figure 13:
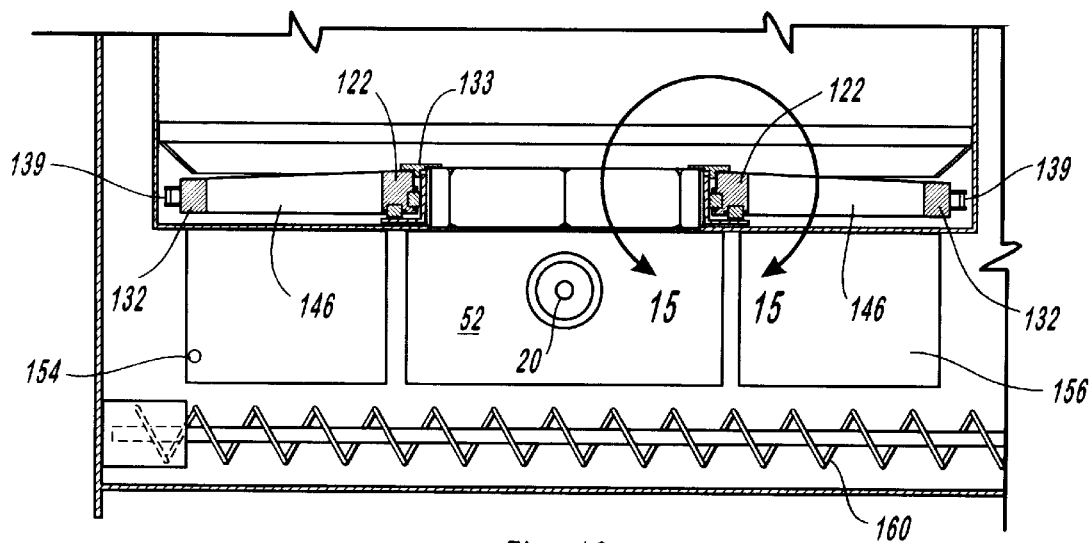
Figure 14:
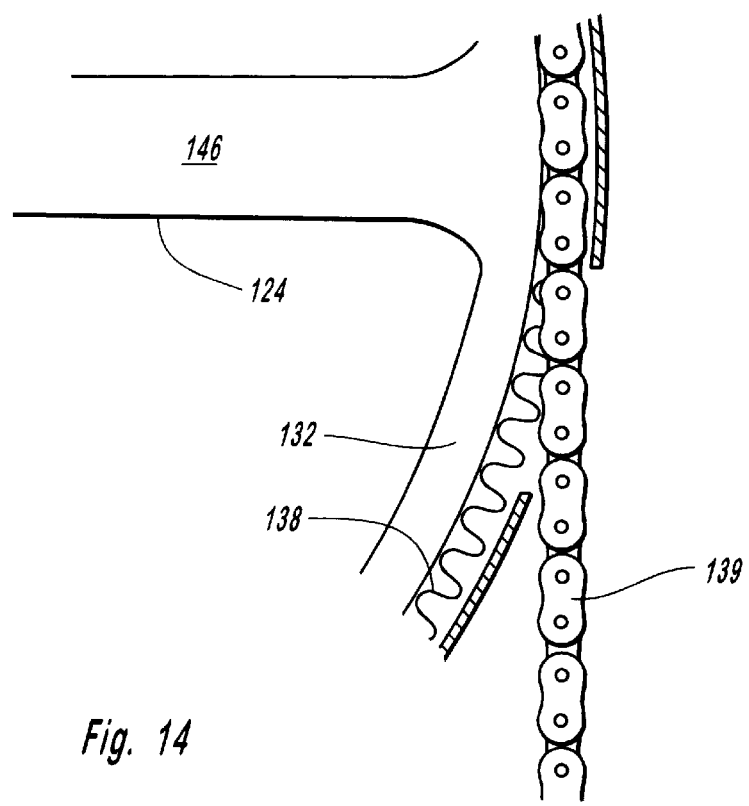
Figure 15:
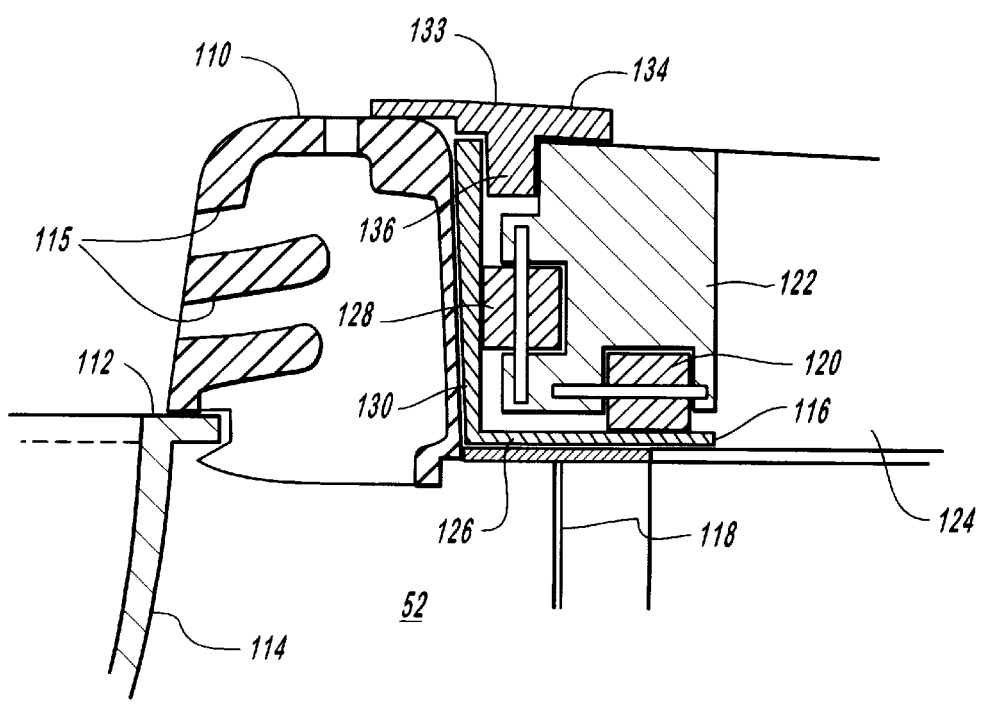

In the drawings:

FIG. 1 is a schematic view of the system of the invention;

FIG. 2, a top plan view of the primary heat exchanger;

FIG. 3, a vertical sectional view through the primary heat exchanger, taken on the line 3—3 of FIG. 2;

FIG. 4, a side elevation of the primary heat exchanger;

FIG. 5, a vertical section view taken on the line 5—5 of FIG. 4;

FIG. 6, an opposite side view of the primary heat exchanger;

FIG. 7, a fragmentary verticle section view, taken on the line 6—6 of FIG. 5;

FIG. 8, an end elevation view of the primary heat exchanger;

FIG. 9, a top plan view of the retort of the system of the invention;

FIG. 10, a side elevation view of the retort;

FIG. 11, a vertical section view taken on the line 11—11 of FIG. 9;

FIG. 12, an enlarged section taken on the line 12—12 of FIG. 10;

FIG. 13, an enlarged section taken on the line 13—13 of FIG. 11;

FIG. 14, an enlarged fragmentary section, taken within the line 14—14 of FIG. 12; and FIG. 15, an enlarged fragmentary section, taken within the line 15—15 of FIG. 13.

DETAILED DESCRIPTION OF THE INVENTION

Referring now to the drawings:

In the illustrated preferred embodiment of the invention the animal waste disposal system is shown generally at 10. The waste disposal system includes a primary heat exchanger or dryer 12 having an inlet 14 receiving manure (animal waste) from a source 16. Dried manure is discharged from the heat exchanger 12 into a dry manure hopper 18.

An auger assembly 20 carries coal from a stoker 22 through a coal hopper 24, receives dried manure from the dry manure hopper 18, and mixes and moves the coal and dried manure into a retort assembly 26 located within a furnace 28. The dried manure and coal mix is burned, with ash resulting from the burning being collected and carried to an ash receiving receptacle 32 by an ash auger drive assembly 34.

Combustion gasses released in the furnace 28 as a result of burning of the coal and dried manure are exhausted through a line 35 into a combustion gas heat exchanger 36 in the primary heat exchanger 12 and from there into a cyclone separator 38. The combustion gasses provide heat for the primary heat exchanger 12 and evaporate water from the raw manure passed through the primary heat exchanger and over the combustion gas heat exchanger 36. The raw manure is also passed over a forced air heat exchanger 40 that provides further heat in the primary heat exchanger 12 for the evaporation of moisture from the raw manure passing through the primary heat exchanger.

The evaporation products resulting from heating of the raw manure in the primary heat exchanger 12 are removed from the primary heat exchanger by a cyclone separator 42 that separates non-condensable gasses and water. The water is passed through a filter 42b of a condenser 42c and may be caught in receptacle 42c for further use. The non-condensable gasses are mixed with fresh air at the inlet 44 to a blower 46 and are blown into the furnace 28 through a primary air inlet 48 or a secondary air inlet 50. Air entering the primary air inlet 48 is directed into an air chamber 52 through which air is supplied to the retort assembly 26 where the coal and dried manure are burned in the furnace 28. The air entering the secondary air inlet 50 is directed into the furnace 28 and through a baffle 56 to provide air necessary to continued burning in the upper portion of furnace 28.

A forced air blower 60 blows air into one side of a jacket 62 formed inside the outer wall of the furnace 28 where the air is heated and then is discharged at conduit 64 into the forced air heat exchanger 40 and at conduit 66 into the primary heat exchanger 12 to assist in drying the raw manure and to be removed with the evaporation products from within the primary heat exchanger 12.

As best seen in FIGS. 2–8 the preferred primary heat exchanger 12 includes a housing 70 with an air jacket 72 formed around the interior of the housing and serving as a heated air passage, receiving heated air through an inlet manifold 74. Heated air traveling through the air jacket 72 passes into at least one hollow skid plate 76. The hollow skid plate 76, together with the air jacket 72 forms the combustion gas heat exchanger 36, and radiates heat into the housing 70 to heat and dry the raw manure and then exits the housing through a duct 78.

Combustion gases from the furnace 28 are also directed to the interior of housing 70 of the primary heat exchanger 12 through the line 35 and an inlet 82. The combustion gases are then directed into a top chamber 84 and one or more of the hollow skid plates 76, forming the forced air heat exchanger 40, before being discharged through a duct 86 to cyclone separator 38. The heated combustion gases heat the forced air heat exchanger, which radiates heat to the raw manure, to cause evaporation of the moisture content of the raw manure.

The raw manure entering housing 70 is deposited on a first conveyor belt 90 and is carried beneath the top chamber 84 before being discharged at the end of the conveyor run onto a first hollow skid plate 76. Cleats 92 spaced along the conveyor belt 90 push the raw manure along the skid plate 76 and off the end of the skid plate and onto a second conveyor belt 90. The second conveyor belt 90 carries the raw manure beneath the first hollow skid plate 76, over the discharge end of the second hollow skid plate and onto a third conveyor belt 90. The third conveyor belt 90 carries the raw manure beneath the second hollow skid plate and discharges the manure onto a discharge conveyor belt 96.

Discharge conveyor belt 96 empties the raw manure through a chute 98 into the dry manure hopper 18.

While three conveyor belts and three hollow skid plates are shown and described more conveyor belts and hollow skid plates can be provided, as necessary to insure complete drying of the raw manure. The raw manure is heated and dried as it travels beneath top chamber 84 and over and under each hollow skid plate 76 and the moisture content of the raw manure is evaporated off, to be discharged through vent 100 that is connected to the cyclone separator 42.

The cleats 92 are preferably in the form of stiff, metal brushes that will drag across the skid plates 76 to move manure along the skid plates and to clean the skid plates. The cleat-brushes produce a "rolling motion" of the manure and maximum manure surface to be exposed to the heated air introduced into the primary heat exchanger 12.

Additional brushes 102 are fixed within primary heat exchanger 12 to brush ends of conveyor belts 90 and to insure that the belts are clean before receiving manure from above. The manure cleaned from the belts 90 by brushes 102 cascades onto the conveyor belt 90 beneath the brush and eventually onto discharge conveyor belt 96 and then into the dried manure hopper 18.

The dried manure is deposited on the auger assembly 20, mixed with coal from hopper 24 and is conveyed into the furnace 28 at the bottom of the furnace and beneath.

The dried manure is deposited on the auger assembly 20, mixed with coal from hopper 24 and is conveyed into the furnace 28 at the bottom of the furnace and beneath the retort assembly 26. The preferred furnace 28 of the invention includes a ring of tuyeres 110 arranged in side-by-side order to surround an upper end 112 of a retort bowl 114. Air from air chamber 52 moves through the passages 115 of the tuyeres into the burning zone of the retort assembly 26. A support ring 116 rests on a wall 118 of air chamber 52, closely surrounding the ring of tuyeres 110. Rollers 120 carried by an inner ring 122 of a rotating ring 124 roll on a leg 126 of the ring 116 extending outwardly from the ring of tuyeres. Rollers 128 carried by the inner ring 122 engage and roll against a leg 130 of the support ring as the rotating ring 124 is turned around the ring of tuyeres.

A shield ring 132, having a generally T-shaped cross section has a top leg 134 extending over and resting on the ring of tuyeres 110 and the edge of leg 130 of the support ring 116. The top leg 134 also extends over a portion of the inner ring 122 of the rotating ring 124. A center leg 136 extends between the leg 130 of the support ring 116 and the inner ring 122 of the rotating ring 124. An outer rim 132 of the rotating ring 124 has a sprocket 138 formed therearound and a chain 139 engages the teeth of the sprocket 138 and the teeth of a sprocket on the output shaft of a gear box 140 that is driven by a motor 142 and chain 144. The inner ring 122 and outer rim 132 are interconnected by radiating arms 146, with spaced apart openings 148 therebetween. As the rotating ring 124 turns around the ring of tuyeres the openings 148 each pass over a pair of ash removal slots 150 and 152.

Ash removal slots 150 and 152 are positioned above chutes 154 and 156, respectively, that discharge onto an ash auger 160, driven by the ash auger drive 34. The ash auger 160 discharges into the ash receiving receptacle 32.

The coal and manure mix delivered to the retort assembly 26 is burned as it passes through and onto the ring of tuyeres. The air necessary to such combustion is supplied through the air chamber 52 and the tuyeres 110, as has been explained. Ash resulting from such burning is pushed over the ring of tuyeres by continually fed coal and dried manure fuel. The ash is pushed over the shield ring and onto vanes 146 and into the openings 148 between vanes 146 to be rotated over the ash removal slots 150 and 152 and to fall onto the ash auger 160.

As the coal and dry manure fuel mix is burned within the ring of tuyeres, unburned particles rising with the generated heat are directed back down by the hollow, curved baffle 56 and by air from combustion air blower 46 to be burned beneath the baffle. The secondary combustion air is supplied through a secondary air manifold and into the curved baffle 56 and then through holes 166 in an inner curved wall 168 of the curved baffle.

Combustion gases from burning in the retort assembly 26 pass beneath and around the baffle 56 to enter a combustion gas chamber 170 through a passage 172, then are traveled down in the gas chamber, past a diverter 174, before exiting the retort assembly 54 through conduit 35. Combustion gases passing the diverter 174 release flue ash that falls through a chute 180 in the floor 182 of the retort assembly and onto the ash auger 160.

I claim:

1. A method of disposing of animal waste comprising the steps of drying animal waste in a dryer;

combining said dried animal waste with a supplemental combustible fuel;

burning said combined dried animal waste and said supplemental combustible fuel;

directing heat from said burning into the dryer;

directing heated water vapor and gases generated in the dryer during burning of said dried animal waste and said supplemental fuel into a first separator;

separating said gasses from said water vapor;

collecting dried ash left upon burning of said dried animal waste and supplemental combustible fuel;

directing exhaust from burning of said dried animal waste and said supplemental fuel into a second separator;

separating solids from gases resulting from burning of said dried animal waste and said supplemental combustion fuel;

recirculating gasses separated from water vapor in said first separator into said burner assembly housing as combustion air for the burning of animal waste and supplemental combustible fuel.

2. A method of disposing of animal waste as in claim 1, wherein the supplemental combustible fuel is crushed coal.

3. A method of disposing of animal waste as in claim 2, further comprising
   collecting ash created by burning the dried animal waste and supplemental combustion fuel.

4. A method of disposing of animal waste as in claim 1, wherein the
   supplemental fuel is a fine particle fuel.

5. A method of disposing of animal waste as in claim 4, further comprising
   circulating particles included with the exhaust from the burning of the animal waste and supplemental combustion fuel, to be re-burned.

* * * * *